United States Patent
Udaka et al.

(10) Patent No.: US 9,150,204 B2
(45) Date of Patent: Oct. 6, 2015

(54) BRAKING FORCE CONTROL DEVICE

(75) Inventors: Satoshi Udaka, Suntou-gun (JP);
Noritaka Yamada, Mishima (JP);
Hideyuki Aizawa, Susono (JP);
Akifumi Doura, Obu (JP)

(73) Assignees: TOYOTA JIDOSHA KABUSHIKI KAISHA, Toyota-shi (JP); ADVICS CO., LTD., Kariya-shi (JP)

( * ) Notice: Subject to any disclaimer, the term of this patent is extended or adjusted under 35 U.S.C. 154(b) by 0 days.

(21) Appl. No.: 13/883,894

(22) PCT Filed: Nov. 2, 2011

(86) PCT No.: PCT/JP2011/075355
§ 371 (c)(1),
(2), (4) Date: May 7, 2013

(87) PCT Pub. No.: WO2012/063716
PCT Pub. Date: May 18, 2012

(65) Prior Publication Data
US 2013/0226429 A1    Aug. 29, 2013

(30) Foreign Application Priority Data
Nov. 8, 2010 (JP) ................................ 2010-250066

(51) Int. Cl.
*B60T 8/1764* (2006.01)
*B60T 8/1761* (2006.01)

(52) U.S. Cl.
CPC ............. *B60T 8/1764* (2013.01); *B60T 8/1761* (2013.01); *B60T 8/17616* (2013.01)

(58) Field of Classification Search
CPC .. B60T 8/1764; B60T 8/1761; B60T 8/17616
USPC .................. 701/70, 71, 78, 80, 82, 83, 90
See application file for complete search history.

(56) References Cited

U.S. PATENT DOCUMENTS

| 6,122,585 A * | 9/2000 | Ono et al. ................... 701/71 |
| 2005/0004740 A1 * | 1/2005 | Miyazaki .................... 701/78 |
| 2009/0218881 A1 | 9/2009 | Aizawa et al. |

FOREIGN PATENT DOCUMENTS

| DE | 196 47 997 A1 | 5/1998 |
| DE | 42 25 983 C2 | 3/2002 |

(Continued)

OTHER PUBLICATIONS

Japanese Office Action Issued Mar. 27, 2013 in JP Patent Application No. 2010-250066 (with partial English translation).

(Continued)

*Primary Examiner* — Thomas Tarcza
*Assistant Examiner* — Kevin Myhre
(74) *Attorney, Agent, or Firm* — Oblon, McClelland, Maier & Neustadt, L.L.P.

(57) ABSTRACT

A braking force control device can control braking forces of the respective wheels of a vehicle, suppresses an increase of the braking force of a first wheel that is a wheel having a relatively large slip amount in a pair of right/left wheels and increases the braking force of a second wheel that is a wheel having a relatively small slip amount. The braking force control device may suppress the increase of the braking force of the first wheel before the friction coefficient of a road surface to the first wheel reaches a peak and when the friction coefficient is in the vicinity of the peak. It is preferable to suppress the increase of the braking force of the first wheel by holding the braking force of the first wheel.

7 Claims, 4 Drawing Sheets

(56) References Cited

FOREIGN PATENT DOCUMENTS

| | | |
|---|---|---|
| DE | 195 42 295 B4 | 6/2005 |
| DE | 197 07 106 B4 | 12/2008 |
| JP | 8 58554 | 3/1996 |
| JP | 11 263152 | 9/1999 |
| JP | 2007 22404 | 2/2007 |
| JP | 2007 282406 | 10/2007 |
| JP | 2009 179322 | 8/2009 |
| JP | 2009 202780 | 9/2009 |

OTHER PUBLICATIONS

International Search Report Issued Jan. 10, 2012 in PCT/JP11/75355 Filed Nov. 2, 2011.

* cited by examiner

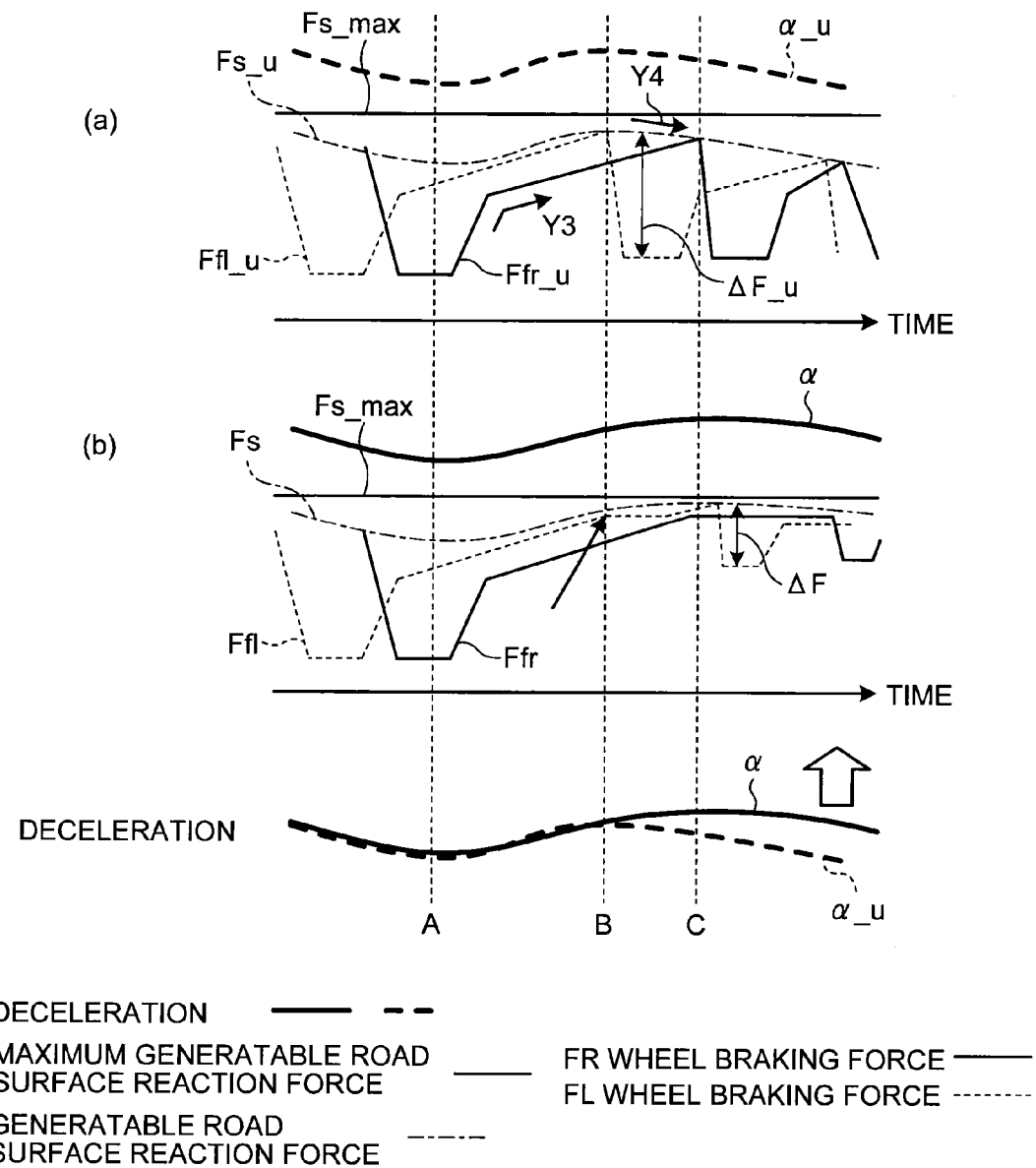

BRAKING FORCE CONTROL DEVICE

FIELD

The present invention relates to a braking force control device.

BACKGROUND

Conventionally, there is proposed a technology for controlling a braking force such as ABS control. Patent Literature 1 discloses a technology of an antiskid control device which is configured such that when it is determined that braking is high μ path/hard braking, at least a first pressure increase has a pressure increase gradient corresponding to pressure increasing characteristics due to a high μ path/hard braking of a maximum wheel cylinder pressure at which a wheel is not locked.

Patent Literature 2 discloses a technology of an antilock braking control device for compensating a dispersion of braking effectiveness of right/left wheels by adjusting a pressure increase amount to a wheel on a side where the wheel has a longer lock interval.

CITATION LIST

Patent Literature

Patent Literature 1: Japanese Patent Application Laid-open No. 2007-22404
Patent Literature 2: Japanese Patent Application Laid-open No. 2009-179322

SUMMARY

Technical Problem

A subject of appropriately exhibiting a braking capability when the braking forces of respective wheels are controlled has not been sufficiently examined. There is, for example, a case that the braking capabilities of respective wheels cannot be sufficiently exhibited because a road surface reaction force that can be generated by other wheel is restricted by the fluctuation of the braking forces of the respective wheels.

An object of the present invention is to provide a braking force control device capable of appropriately exhibiting the braking capabilities of wheels.

Solution to Problem

In a braking force control device according to the present invention, the braking force control device can control braking forces of respective wheels of a vehicle, and the braking force control device suppresses increase of the braking force of a first wheel that is a wheel having a relatively large slip amount in a pair of right and left wheels, and increases the braking force of a second wheel that is a wheel having a relatively small slip amount until the slip amount of the second wheel becomes larger than the slip amount of the first wheel.

In the braking force control device, it is preferable that the braking force control device suppresses the increase of the braking force of the first wheel before a friction coefficient of a road surface to the first wheel reaches a peak.

In the braking force control device, it is preferable that the braking force control device suppresses the increase of the braking force of the first wheel before a friction coefficient of a road surface to the first wheel reaches a peak and when the friction coefficient is in the vicinity of the peak.

In the braking force control device, it is preferable that suppressing the increase of the braking force of the first wheel means to hold the braking force of the first wheel.

In the braking force control device, it is preferable that when the pair of the right/left wheels is the rear wheels of the vehicle, the increase of the braking force of the rear wheels is stopped before the friction coefficient of a road surface to the rear wheels reaches a peak.

In the braking force control device, it is preferable that an upper limit of a braking force of the rear wheels when the increase of the braking force is stopped is based on a fluctuation amount of a ground contact load of the rear wheels at the time of braking.

Advantageous Effects of Invention

The braking force control device according to the present invention suppresses an increase of the braking force of a first wheel which is a wheel having a relatively large slip amount and increases the braking force of a second wheel which is a wheel having a relatively small slip amount in a pair of right/left wheels. With the configuration, the braking force control device according to the present invention achieves an effect that the braking capabilities of the wheels can be appropriately exhibited until the slip amount of the second wheel becomes larger than the slip amount of the first wheel.

BRIEF DESCRIPTION OF DRAWINGS

FIG. 5 is a view explaining conventional braking force control and the braking force control of the embodiment.

DESCRIPTION OF EMBODIMENTS

A braking force control device according to an embodiment of the present invention will be explained below in detail referring to drawings. Note that the present invention is not limited by the embodiment. Further, components in the embodiments include the components that can be easily conceived by a person skilled in the art or substantially the same components.

Embodiment

Figure 1:
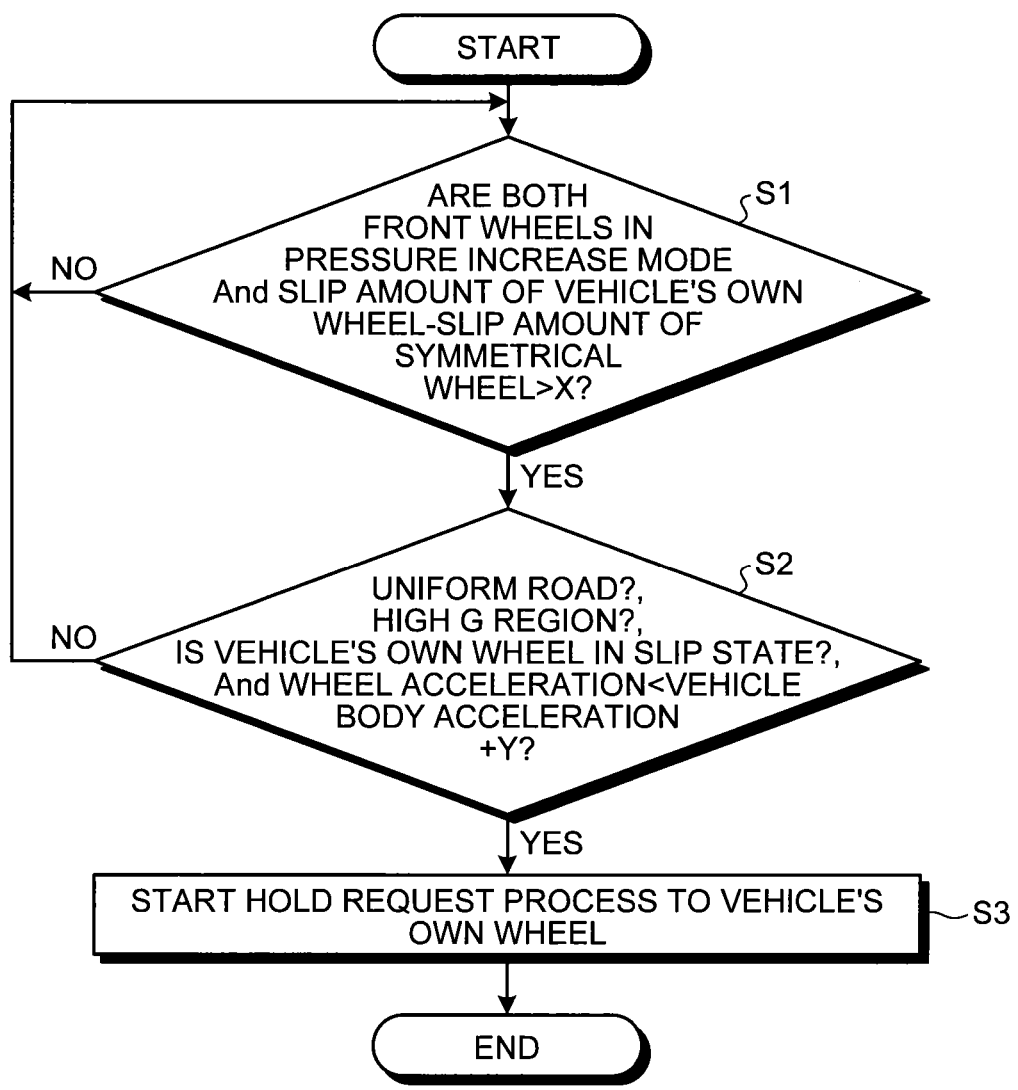
FIG. 1 is a flowchart illustrating the operation of a braking force control device according to an embodiment.
Figure 2:
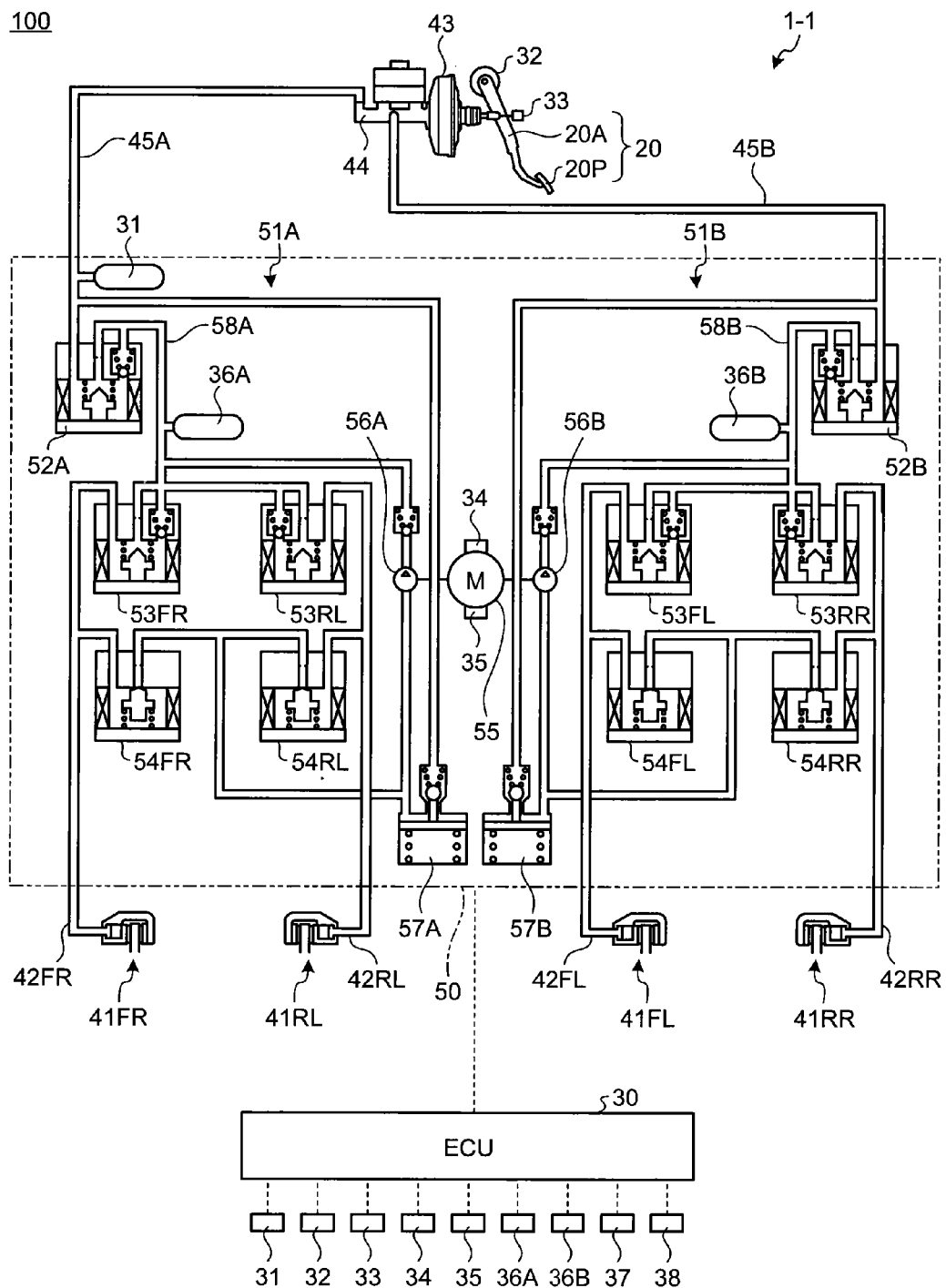
FIG. 2 is a view illustrating a main portion of a vehicle on which the braking force control device according to the embodiment is mounted.

An embodiment will be explained referring to FIG. 1 to FIG. 5. The embodiment relates to a braking force control device. FIG. 1 is a flowchart illustrating the operation of a braking force control device according to an embodiment and FIG. 2 is a view illustrating a main portion of a vehicle on which the braking force control device according to the embodiment is mounted.

Conventionally, in ABS control of a vehicle, the braking forces of respective wheels are independently controlled. In the case, the change of the control cycles of a wheel (pressure reduction pressure increase) changes vehicle body deceleration and thus the ground contact load of a wheel is changed thereby. This phenomenon changes the slip amount of other wheel and influences the control cycles of the wheel. As described above, deceleration, which can be intrinsically generated, cannot be generated by the mutual influence of the control cycles of the respective wheels.

A braking force control device 1-1 of the embodiment can reduce an unnecessary pressure reduction by cooperatively controlling a braking force by monitoring the slip amounts of respective wheels. According to the embodiment, a pressure reduction is suppressed as compared with a case that respective wheels are independently controlled with a result that the respective wheels are caused to appropriately exhibit a braking capability and deceleration of a vehicle can be improved.

It is supposed that the embodiment has the following components:

(1) Wheel speed sensors of four wheels;
(2) A vehicle body speed sensor or a mechanism and a logic for estimating a vehicle body speed;
(3) An ECU for measuring the differential value (wheel acceleration) of wheel speeds and the wheel speeds;
(4) A vehicle body deceleration sensor or logic for estimating and calculating a vehicle body acceleration;
(5) Logic for calculating the slip rates of respective wheels;
(6) Logic for calculating the difference between the slip rates of right/left wheels;
(7) Logic for determining whether or not wheel acceleration exceeds a predetermined threshold value; and
(8) An actuator capable of controlling a braking force gradient (brake pressure gradient).

The braking force control device 1-1 of the embodiment can achieve the following effects.

In a state that right/left wheels have a different slip rate on a uniform road surface:

(i) Deceleration is increased by causing the braking force of a vehicle's own wheel to be held to a slip ratio just before a peak μ slip rate and increasing the braking force of a symmetrical wheel during the period in which the braking force of the vehicle's own wheel is increased;

(ii) As a result, since the braking force of the vehicle's own wheel is provided with an allowance to the road surface reaction force that can be generated, the slip rate (amount) is reduced.

(iii) Since the vehicle's own wheel is provided with the allowance to the road surface reaction force (the slip rate is recovered), the vehicle's own wheel can begin to increase pressure again.

Repeated execution of the items (i) to (iii) causes the braking force of both front wheels to be approached to a road surface reaction force that can be generated in a maximum amount. In other words, the deceleration of the vehicle is approached to the state of deceleration that can be generated in the maximum amount. The braking force control device 1-1 of the embodiment reduces the unnecessary pressure reduction of a brake fluid pressure by cooperatively increasing the braking forces of the right/left wheels to thereby make it possible execute braking force control for deriving the potential of a tire.

As illustrated in FIG. 2, a vehicle 100 includes the braking force control device 1-1. The braking force control device 1-1 includes an ECU 30, braking force generating means 41FR, 41FL, 41RR, 41RL, and a brake actuator 50. The ECU 30 can control the braking forces of the respective wheels of the vehicle 100. The vehicle 100 includes, as a braking device, a brake pedal 20, the braking force generating means 41FR, 41FL, 41RR, 41RL, braking force generating means side brake fluid pipes 42FL, 42FR, 42RL, 42RR, a brake booster 43, a master cylinder 44, and a brake actuator 50. Note that, in the embodiment, a suffix FL shows a component relating to a front left wheel of the vehicle 100, FR shows a component relating to a front right wheel of the vehicle 100, RL shows a component relating to a rear left wheel of the vehicle 100, and RR shows a component relating to a rear right wheel of the vehicle 100, respectively.

In the embodiment, when it is not necessary to particularly discriminate the braking force generating means 41FR, 41FL, 41RR, 41RL, they are simply described also as "a braking force generating means 41". Likewise, when it is not particularly necessary to discriminate the four wheels, the braking force generating means side brake fluid pipes 42FL, 42FR, 42RL, 42RR are described also as a braking force generating means side brake fluid pipes 42, and the like omitting the suffixes FL, FR, RL, RR.

The braking force generated by the ECU 30 to the respective wheels is a mechanical braking force, and specifically, a braking force making use of a friction force. The ECU 30 applies mechanical wheel braking torque generated by friction to the respective wheels by the pressure (hereinafter, simply described also "fluid pressure" or "brake fluid pressure") of a brake fluid as a working fluid and generates a wheel braking force to the respective wheels. In the embodiment, the wheel braking force is described also simply as "braking force". The vehicle 100 is braked by the wheel braking force. Deceleration is generated to the vehicle 100 by acting the road surface reaction force for braking the vehicle 100 on the respective wheels to which the wheel braking force is generated.

The braking force generating means 41FL, 41FR, 41RL, 41RR are mechanical and friction type brake means and are a friction braking device for generating a braking force (friction braking force) between, for example, a brake pad and a disc rotor by a friction force. The braking force generating means 41FL, 41FR, 41RL, 41RR generate braking forces for braking the wheels by the fluid pressure of the working fluid supplied thereto.

The brake booster 43 increases the pedal depression force input to the brake pedal 20 by a driver. The brake pedal 20 has a pedal arm 20A for transmitting the depression force of the driver to the master cylinder 44 via the brake booster 43 and a pedal main body 20P attached to the pedal arm 20A for transmitting the depression force of the driver to the pedal arm 20A. The depression force of the driver becomes a force for generating the wheel braking force to the respective wheels. The master cylinder 44 converts the depression force increased by the brake booster 43 to the brake fluid pressure. The brake actuator 50 transmits the converted brake fluid pressure to the respective braking force generating means side brake fluid pipes 42FL, 42FR, 42RL, 42RR as it is or after it has been adjusted.

The brake actuator 50 is connected to respective braking force generating means 41FL, 41FR, 41RL, 41RR by the braking force generating means side brake fluid pipes 42FL, 42FR, 42RL, 42RR. Further, the brake actuator 50 is connected to the master cylinder 44 by a master cylinder side first brake fluid pipe 45A and a master cylinder side second brake fluid pipe 45B.

The master cylinder 44, the braking force generating means side brake fluid pipes 42FL, 42FR, 42RL, 42RR, the master cylinder side first brake fluid pipe 45A, the master cylinder side second brake fluid pipe 45B, and a brake fluid path disposed in the brake actuator 50 are filled with a brake fluid.

In the embodiment, the brake actuator 50 has a function for individually adjusting the brake fluid pressures of the respective braking force generating means side brake fluid pipes

42FL, 42FR, 42RL, 42RR. The brake actuator 50 can generate wheel braking forces each having an independent magnitude to the respective wheels. ABS control, brake assist control, hill start assist control, and the like are executed by that the braking force control device 1-1 drives and controls the brake actuator 50.

The operation of the brake actuator 50 is controlled by the ECU 30 so that a wheel braking force according to a vehicle braking force as a target (target vehicle braking force) is generated to the respective wheels. The ECU 30 is configured by combining, for example, a microcomputer, a memory, and the like and controls the wheel braking forces to the respective wheels. The ECU 30 is connected with a master cylinder pressure sensor 31, a stroke sensor 32, and a depression force detecting switch 33 as a means for detecting a brake operation state, that is, the operation state of the brake pedal 20 of the vehicle 100 operated by the driver (brake operation detecting means). The braking force control device 1-1 includes at least one brake operation detecting means.

The brake actuator 50 includes a first fluid pressure transmission system 51A for transmitting the brake fluid pressure from the master cylinder 44 to the braking force generating means 41FR, 41RL and a second fluid pressure transmission system 51B for transmitting the brake fluid pressure to the braking force generating means 41FL, 41RR. The first fluid pressure transmission system 51A is connected to the master cylinder 44 by the master cylinder side first brake fluid pipe 45A and the second fluid pressure transmission system 51B is connected to the master cylinder 44 by the master cylinder side second brake fluid pipe 45B.

In the first fluid pressure transmission system 51A, the brake fluid pressure from the master cylinder 44 is transmitted to the braking force generating means 41FR, 41RL via the master cylinder side first brake fluid pipe 45A, a first master cut valve 52A that is a flow rate control valve, a first high pressure brake fluid pipe 58A that is a brake fluid path, and a hold solenoid valves 53FR, 53RL. A pressure reduction solenoid valves 54FR, 54RL are connected between the hold solenoid valves 53FR, 53RL and the braking force generating means 41FR, 41RL.

Operating the hold solenoid valves 53FR, 53RL and the pressure reduction solenoid valves 54FR, 54RL causes the brake fluid pressure acting on the braking force generating means 41FR, 41RL to be increased and reduced to thereby adjust the braking forces of the front right wheel and rear left wheel, respectively. For example, changing the duty ratio between the open time and the close time of the hold solenoid valves 53FR, 53RL and the pressure reduction solenoid valves 54FR, 54RL causes the brake fluid pressure acting on the braking force generating means 41FR, 41RL to be increased and reduced.

In the second fluid pressure transmission system 51B, the brake fluid pressure from a master cylinder 44 is transmitted to the braking force generating means 41FL, 41RR via the master cylinder side second brake fluid pipe 45B, a second master cut valve 52B that is a flow rate control valve, a second high pressure brake fluid pipe 58B that is a brake fluid path, and hold solenoid valves 53FL, 53RR. A pressure reduction solenoid valves 54FL, 54RR are connected between the hold solenoid valves 53FL, 53RR and the braking force generating means 41FL, 41RR.

Operating the hold solenoid valves 53FL, 53RR and the pressure reduction solenoid valves 54FL, 54RR causes the brake fluid pressure acting on the braking force generating means 41FL, 41RR to be increased and reduced to thereby adjust the braking forces of the front left wheel and the rear right wheel, respectively. For example, the change of the duty ratio between the open time and the close time of the hold solenoid valves 53FL, 53RR and the pressure reduction solenoid valves 54FL, 54RR causes the brake fluid pressure acting on the braking force generating means 41FL, 41RR to be increased and reduced.

Each of the first master cut valve 52A and the second master cut valve 52B (hereinafter, described as master cut valves 52 as necessary), which are the flow rate control valves, has a linear solenoid and a spring. The master cut valves 52 are a normally-open electromagnetic flow rate control valve which is held in an open state at the time of non-energization of the solenoid and further whose degree of opening can be adjusted by adjusting a current supplied to the solenoid. The degree of opening of the master cut valve 52 is linearly changed by using the linear solenoid. The master cut valve 52 can create a differential pressure (master cut valve differential pressure) $\Delta P\_SMC$ (=Pe−Pi) between the brake fluid pressure Pe at an outlet and the brake fluid pressure Pi at an inlet and can linearly change the differential pressure $\Delta P\_SMC$ by adjusting the degree of opening.

The inlet side pressures of the first master cut valve 52A and the second master cut valve 52B are detected by the master cylinder pressure sensor 31 and obtained by the ECU 30. Further, the brake fluid pressures inside of the first high pressure brake fluid pipe 58A and the second high pressure brake fluid pipe 58B are detected by the first outlet side brake fluid pressure sensor 36A and the second outlet side brake fluid pressure sensor 36B attached to the first high pressure brake fluid pipe 58A and the second high pressure brake fluid pipe 58B, respectively and obtained by the ECU 30. Note that the master cut valve differential pressure can be also determined from the control current supplied to the master cut valve 52.

The outlets of the pressure reduction solenoid valves 54FR, 54RL and the master cylinder side first brake fluid pipe 45A are connected to a first brake fluid reservoir 57A, respectively. Further, the outlets of the pressure reduction solenoid valves 54FL, 54RR and the master cylinder side second brake fluid pipe 45B are connected to a second brake fluid reservoir 57B, respectively.

The brake actuator 50 includes a first pump 56A for pressurizing the brake fluid in the first fluid pressure transmission system 51A to adjust the fluid pressure of the first fluid pressure transmission system 51A and further includes a second pump 56B for pressurizing the brake fluid in the second fluid pressure transmission system 51B to adjust the fluid pressure in the second fluid pressure transmission system 51B. Pressurizing the brake fluid in the first fluid pressure transmission system 51A by the first pump 56A increases the pressure of the brake fluid, that is, the fluid pressure applied to the braking force generating means 41FR, 41RL. Likewise, the pressurization of the brake fluid in the second fluid pressure transmission system 51B executed by the second pump 56B increases the fluid pressure applied to the braking force generating means 41FL, 41RR.

The first pump 56A and the second pump 56B are driven by a pump driving electric motor 55. The ECU 30 controls the operation of the pump driving electric motor 55 based on the drive current of the pump driving electric motor 55 detected from an ammeter 34 and on the rotation angle of the pump driving electric motor 55 detected from a resolver 35.

When the first master cut valve 52A and the second master cut valve 52B are opened, the brake fluid ejected from the first pump 56A and the second pump 56B circulate between the master cut valve 52, and the first brake fluid reservoir 57A and the second brake fluid reservoir 57B. Accordingly, no master cut valve differential pressure is generated. In contrast, when the control current is caused to flow to the first master cut valve 52A and the second master cut valve 52B and reduces the degrees of opening of the valves 52A, 52B, the master cut valve differential pressure is generated. With the operation, the brake fluid pressure acting on the braking force generating means 41FR, 41RL, 41FL, 41RR can be increased equal to or more than the brake fluid pressure in the master cylinder 44.

Further, even when the first pump 56A and the second pump 56B are not in operation, the brake fluid pressure acting on the braking force generating means 41FR, 41RL, 41FL, 41RR can be held by reducing the degrees of opening of the first master cut valve 52A and the second master cut valve 52B. Even if the brake fluid pressure in the master cylinder 44 is reduced, the brake fluid pressure acting on the braking force generating means 41FR, 41RL, 41FL, 41RR can be held by generating the master cut valve differential pressure by reducing the degree of opening of the master cut valve 52 according to the change of the brake fluid pressure in the master cylinder 44.

The ECU 30 is connected with the ammeter 34, the resolver 35, a first outlet side brake fluid pressure sensor 36A, a second outlet side brake fluid pressure sensor 36B, and wheel speed sensors 37. The wheel speed sensors 37 are disposed to the respective wheels of the vehicle 100, detect the wheel speeds of the respective wheels, respectively, and output the detected wheel speeds to the ECU 30. Further, the ECU 30 is connected with a vehicle body deceleration sensor 38. The vehicle body deceleration sensor 38 detects the acceleration of the vehicle 100 in a front-back direction and can detect the vehicle body deceleration of the vehicle 100. A signal showing the result of detection of the vehicle body deceleration sensor 38 is output to the ECU 30.

The ECU 30 controls the operation of the brake actuator 50 and generates a target wheel braking force that is a target wheel braking force of each wheel. The ECU 30 determines the target wheel braking force of each wheel based on the target vehicle braking force. The target vehicle braking force is, for example, a target value necessary to brake the vehicle 100 according to the operation state amount of the brake pedal 20 operated by the driver. The operation state amount of the brake pedal 20 is, for example, a pedal stroke amount, a pedal stroke position, a depression force, a pedal operation speed, and the like. Further, the target wheel braking force is a braking force shared by the respective wheels to apply the target vehicle braking force to the vehicle 100.

When an actual wheel braking force is insufficient to the target wheel braking force, the ECU 30 increases the brake fluid pressure supplied to the braking force generating means 41 of a relevant wheel. In the pressure increase mode, a hold solenoid valve 53 corresponding to the wheel is opened and a pressure reduction solenoid valve 54 is closed. At the time, a pressure increase speed can be also controlled by the duty control of the hold solenoid valve 53. Further, when master cylinder pressure is insufficient, the ECU 30 can drive a pump 56 to generate the target wheel braking force.

In contrast, when the actual wheel braking force exceeds the target wheel braking force, the ECU 30 reduces the brake fluid pressure to be supplied to the braking force generating means 41 of the wheel. In the pressure reduction mode, the hold solenoid valve 53 corresponding to the wheel is closed and the valve pressure reduction solenoid valve 54 is opened. Further, the brake actuator 50 can hold the brake fluid pressure to be supplied to the braking force generating means 41 of the respective wheels. In the hold mode, the ECU 30 closes the hold solenoid valve 53 and the pressure reduction solenoid valve 54 corresponding to the wheel as a target to be held.

Figure 3:
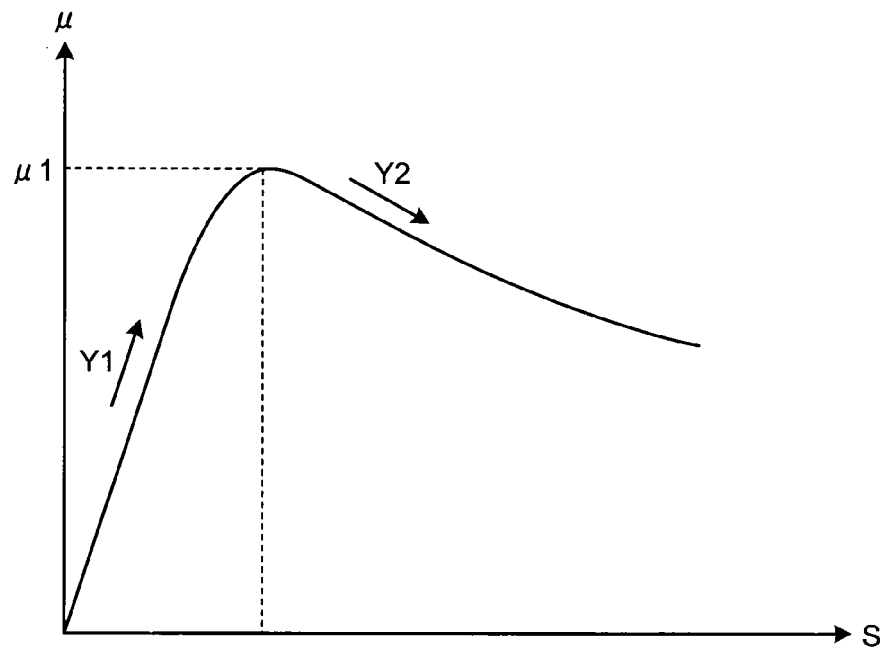
FIG. 3 is a μ-s graph illustrating the relation between a friction coefficient and a slip rate.

The ECU 30 can execute the ABS control. Conventionally, in the ABS control, the braking force is controlled independently to the respective wheels. For example, in the respective wheels, the braking force of a vehicle's own wheel is controlled based on the slip amount of the vehicle's own wheel. An example of a series of control cycles of the braking force control will be explained referring to FIG. 3. FIG. 3 is a μ-s graph illustrating the relation between the friction coefficient μ of a road surface to a wheel (tire) and the slip rate s of the wheel. In FIG. 3, a horizontal axis illustrates the slip rate s of the wheel, and a vertical axis illustrates the friction coefficient μ of the road surface.

At the time of braking, the slip rate s increases according to the increase of the braking force. In the region in which the slip rate s is relatively small, the friction rate μ increases according to the increase of the slip rate s as illustrated in an arrow Y1. However, when the slip rate s increases to some extent, the rate of increase of the friction coefficient μ to the increase of the slip rate s is reduced and the friction coefficient reaches a peak μ1. After the friction coefficient μ has reached the peak μ1, increasing the slip rate s reduces the friction coefficient μ as illustrated in an arrow Y2.

The peak μ1 exists in the μ-s characteristics showing the relation between the friction coefficient μ and the slip rate s as described above. Accordingly, when the brake fluid pressure to the braking force generating means 41 of the respective wheels is increased, the braking force increases at the beginning of pressure increase, the increase of the slip rate s increases also the coefficient μ (Y1), and when the friction coefficient μ has exceeded the peak μ1, the increase of the slip rate s reduces the friction coefficient μ (Y2). Further, the friction coefficient μ has exceeded the peak the growth of the slip rate s is accelerated. That is, when the brake fluid pressure is larger than the brake fluid pressure correspond to the peak μ1, the change of the slip rate s per unit time becomes large as compared with the case that the brake fluid pressure is smaller than the brake fluid pressure corresponding to the peak μ1.

Conventionally, in the ABS control, when the brake fluid pressure to the braking force generating means 41 is increased, the brake fluid pressure is reduced after the friction coefficient μ has exceeded the peak μ1. When, for example, it is detected based on the slip rate s that the friction coefficient μ has exceeded the peak μ1, the brake fluid pressure is reduced. With the operation, the braking force can be increased up to the braking force corresponding to the maximum road surface reaction force (deceleration) which can be applied to the respective wheels at the time. After the pressure reduction has been completed and the slip rate s has reduced, the operation shifts to the pressure increase mode again and a series of ABS cycles is repeated. However, when the braking forces are independently controlled to the respective wheels, the potential of the tire may not be sufficiently derived as explained below.

Figure 4:
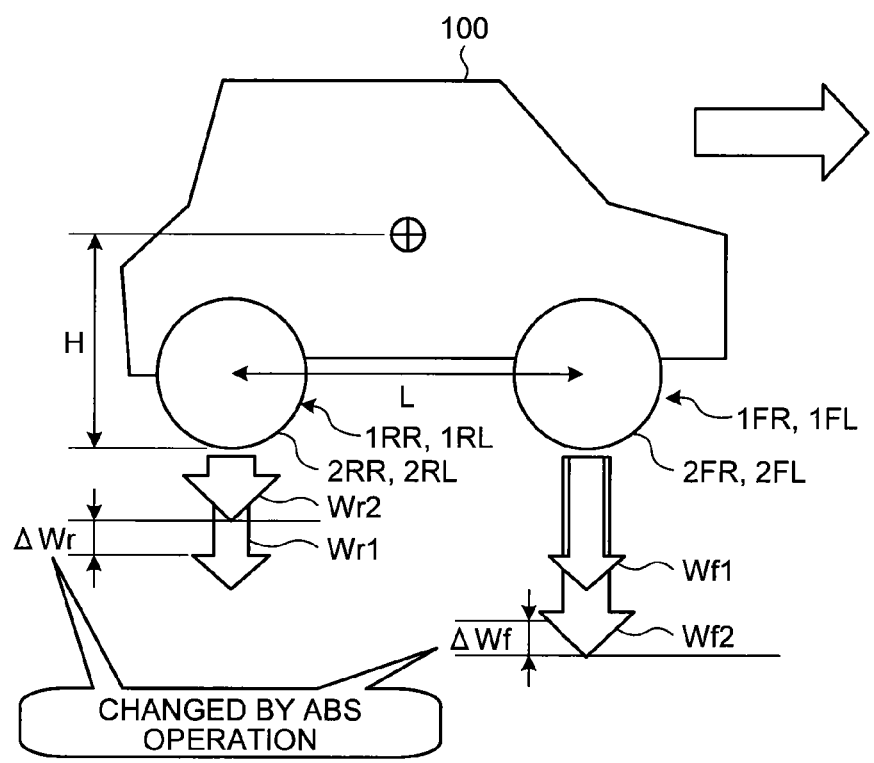
FIG. 4 is a view illustrating the fluctuation of a ground contact load at the time of braking.

FIG. 4 is a view illustrating the fluctuation of a ground contact load at the time of braking, and FIG. 5 is a view explaining conventional braking force control and the braking force control of the embodiment. In FIG. 4, reference numeral 1 denotes a wheel. In the embodiment, when it is not necessary to discriminate a front right wheel 1FR and a front left wheel 1FL, they are also simply described as "the front wheels 1F". Further, when it is not necessary to discriminate a rear right wheel 1RR and a rear left wheel 1RL, they are also simply described as "the rear wheels 1R". Reference numerals 2FR, 2FL, 2RR, 2RL denote a right front tire, a left front tire, a right rear tire, a left rear tire, respectively. Further, Wf1 and Wr1 denote a front wheel weight (front wheel ground contact load) and a rear wheel weight (rear wheel ground contact load), respectively when a vehicle stops on a flat path. Wf2 and Wr2 denote a front wheel weight and a rear wheel weight, respectively at the time of braking.

At the time of braking, the front wheel weight Wf2 and the rear wheel weight Wr2 change according to the deceleration of the vehicle 100. ΔWf denotes the fluctuation amount of the front wheel weight and ΔWr denotes the fluctuation amount of the rear wheel weight, respectively. As to, for example, the front right wheel 1FR, Expression (1) and Expression (2) described below are established from a wheel motion equation.

$$I \cdot d\omega/dt = \mu \cdot W(\alpha) \cdot R - Ffr \cdot R \quad (1)$$

$$W(\alpha) = Wf/2 + (H/L) \cdot (W/2) \cdot \alpha \quad (2)$$

Where, W: vehicle weight, Wf: front wheel weight, Wr: rear wheel weight, W(α): front right wheel ground contact load, L: wheel base H: center of gravity height, α: deceleration, R: tire diameter, dω/dt: wheel's angular acceleration, Ffr: front right wheel braking force, Ffl: front left wheel braking force, Frr: rear right wheel braking force, Frl: rear left wheel braking force, μ: tire-road surface friction coefficient, and I: tire inertia, respectively.

Further, deceleration α can be shown by Expression (3) described below.

$$\alpha = (Ffr + Ffl + Frr + Frl)/W \quad (3)$$

When it is assumed that a tire 2 is in a lock region at the time I·dw/dt≤0 is established, the front right the wheel braking force Ffr must satisfy Expression (4) described below from Expressions (1) to (3) to prevent the tire 2FR from being locked.

$$Ffr \geq K1 \cdot (Ffl + Frr + Frl) + K2 \quad (4)$$

Note that K1 and K2 are constants, respectively.

It can be found from Expression (2) that when the friction coefficient μ is the peak value μ1, the front right the wheel braking force Ffr is a braking force Ffr_max which is shown by Expression (5) described below and whose magnitude is maximized.

$$Ffr\_max = \mu 1 \cdot (Wf/2 + (H/L) \cdot (W/2) \cdot \mu 1 \cdot g) \quad (5)$$

As shown in Expression (4), the braking force which can be generated by the front right wheel 1FR without locking the right front tire 2FR is regulated by the braking forces of the other wheels 1FL, 1RR, 1RL. That is, the braking force of each wheel 1 affects the braking force which can be generated by the other wheel 1. Accordingly, when the respective wheels are independently controlled, the braking force cannot be caused to reach the braking force corresponding to the road surface reaction force that can be generated in a maximum magnitude as explained below referring to FIG. 5.

FIG. 5 illustrates a time chart according to (a) conventional braking force control and a time chart according to (b) the braking force control of the embodiment, respectively.

In braking force control in the conventional ABS control, a front right wheel braking force Ffr_u and a front left wheel braking force Ffl_u are independently controlled without cooperation. For example, the front right wheel braking force Ffr_u is controlled based on the slip amount of the front right wheel 1FR and the front left wheel braking force Ffl_u is controlled based on the slip amount of the front left wheel 1FL, respectively. As a result, a generatable road surface reaction force Fs_u cannot be caused to reach a maximum generatable road surface reaction force Fs_max.

The maximum generatable road surface reaction force Fs_max is a theoretically generatable maximum road surface reaction force and is, for example, a maximum road surface reaction force which can be generated when a load movement toward the front of the vehicle has reached a peak and has been constant under a predetermined road surface condition. The maximum generatable road surface reaction force Fs_max is a value showing the potential of the tires 2.

Further, the generatable road surface reaction force Fs_u shows a road surface reaction force that can be generated at the time as a result of the load movement in the vehicle 100. That is, the generatable road surface reaction force Fs_u is fluctuated according to the magnitude of the load movement. Unless the load movement has reached a peak, the magnitude of the generatable road surface reaction force Fs_u becomes smaller than the magnitude of the maximum generatable road surface reaction force Fs_max. In FIG. 5, the pressure reduction of the front right wheel 1FR has been finished at a time A and the operation becomes the hold mode. Since pressure is increased thereafter, the front right wheel braking force Ffr_u is increased as illustrated in an arrow Y3.

In contrast, in the front left wheel 1FL whose pressure has been started to be increased prior to the front right wheel 1FR, the braking force Ffl_u reaches the generatable road surface reaction force Fs_u at a time B and pressure is reduced based on the increase of the slip amount. Since the pressure is reduced in the front left wheel 1FL and the front left wheel braking force Ffl_u is reduced, the load movement amount to the front wheels 1F is reduced. As a result, the generatable road surface reaction force Fs_u in the front wheels 1F is reduced as illustrated in an arrow Y4.

As a result, the front right wheel braking force Ffr_u cannot reach the maximum generatable road surface reaction force Fs_max, and when the front right wheel braking force Ffr_u has reached the generatable road surface reaction force Fs_u at a time C, the friction coefficient μ reaches the peak μ1 and the pressure applied to the front right wheel 1FR is reduced. As described above, when the braking forces of the respective wheels are independently controlled, the pressure applied to the respective wheels is reduced at the time the generatable road surface reaction force Fs_u smaller than the maximum generatable road surface reaction force Fs_max has been reached.

The slip rate of each wheel is shown by Expression (6) described below.

$$\text{(generatable road surface reaction force} - \text{braking force of each wheel)} \propto \text{slip rate of each wheel} \quad (6)$$

That is, when the braking forces of the respective wheels have a value corresponding to the generatable road surface reaction force, the difference between the slip rates of the respective wheels becomes small. In contrast, in a wheel, for example, in the front left wheel 1FL, when the front left wheel braking force Ffl_u is smaller than the generatable road surface reaction force on a uniform road, although the slip rate is reduced in the front left wheel 1FL, the slip rate of a symmetrical wheel is increased. For example, at the time C of FIG. 5, since the front left wheel braking force Ffl_u becomes greatly smaller than the generatable road surface reaction force Fs_u, the slip rate of the front left wheel 1FL is small. In contrast, since the front left wheel braking force Ffl_u is small, the load movement toward the front of the vehicle becomes small, and the generatable road surface reaction force Fs_u is on a low level. Accordingly, the slip rate of the front right wheel 1FR that is a symmetrical wheel is increased prior to the braking force (maximum generatable road surface reaction force Fs_max) which can be intrinsically generated, thereby the ABS cycles are generated. As described above, when the braking forces of the respective wheels are independently controlled, the difference between the slip rates of the right/left wheels is increased due to the alternate generation of the ABS cycles, and the like.

The braking force control device 1-1 of the embodiment compares the slip rates of the right/left wheels and determines whether or not the road surface reaction force has an allowance. When the braking force has an allowance to the generatable road surface reaction force, the increase of the brake fluid pressure in a wheel in which a slip is grown is suppressed to thereby suppress the increase of braking force and the braking force of a wheel having the allowance is increased. That is, in a pair of the right and left wheels 1, the increase of the braking force of a first wheel that is a wheel 1 having a relatively large slip amount is suppressed and the braking force of a second wheel that is the other wheel 1 having a relative small slip amount is increased. Further, control for suppressing the increase of the braking force of the first wheel is executed before the friction coefficient μ of a road surface to the first wheel has reached the peak μ1, that is, during a period in which the braking force of the first wheel has an allowance to the generatable road surface reaction force in the pressure increase mode.

When the braking force of the second wheel is increased and right/left slip amounts are inverted while the increase of the braking force of the first wheel is being suppressed, the wheel that is the second wheel up to the time becomes the first wheel, whereby the increase of the braking force thereof is suppressed. In contrast, the wheel that is the first wheel up to the time becomes the second wheel, thereby the braking force thereof is increased. As described above, the braking force control device 1-1 increases the generatable road surface reaction force Fs by alternately increasing right/left braking forces by in cooperation to thereby cause the braking forces of both the right/left wheels to approach to the maximum generatable road surface reaction force Fs_max.

A braking control of the embodiment will be explained referring to FIG. 1 and FIG. 5. A control flow illustrated in FIG. 1 is executed when, for example, the vehicle 100 is braked. Further, the control flow of FIG. 1 is executed to each of the front right wheel 1FR and the front left wheel 1FL simultaneously or alternately. Here, the case that the control flow of FIG. 1 is executed to the front left wheel 1FL will be explained.

First, at step S1, the ECU 30 determines whether or not Condition 1 and Condition 2 described below are established.

Condition 1: Both the front wheels 1F are in the pressure increase mode; and

Condition 2: Slip amount of vehicle's own wheel-slip amount of symmetrical wheel >X.

Condition 1 shows that a mode for increasing the brake fluid pressure is executed to the braking force generating means 41 in each of the front right wheel 1FR and the front left wheel 1FL. Condition 2 shows that the slip amount of the front left wheel 1FL that is the vehicle's own wheel is larger than the slip amount of the front right wheel 1FR that is a symmetrical wheel and that the difference between the slip amount of the vehicle's own wheel and the slip amount of the symmetrical wheel is larger than a predetermined amount X. When Condition 2 is established, the front left wheel 1FL that is the vehicle's own wheel is the first wheel having the relatively large slip amount, and the front right wheel 1FR that is the symmetrical wheel is the second wheel having the relative small slip amount. In a part (b) of FIG. 5, since the front right wheel 1FR and the front left wheel 1FL are in the pressure increase mode together at, for example, the time B, Condition 1 is established.

The ECU 30 determines whether or not Condition 2 is established based on the wheel speed of the front right wheel 1FR and the wheel speed of the front left wheel 1FL detected by the wheel speed sensors 37 and based on an estimated vehicle body speed Vref. The vehicle body speed Vref is calculated based on, for example, the wheel speeds of the respective wheels 1 detected by, for example, the wheel speed sensors 37. The vehicle body speed Vref may be calculated using, for example, the wheel speed of the rear wheel 1R as a reference. Further, the slip amount of each wheel can be calculated by, for example, Expression (7) described below.

$$\text{Slip} = Vref - Vw \quad (7)$$

where, Slip: slip amount, Vw: wheel speed of each wheel. Further, the slip rate of each wheel can be determined by dividing the slip amount Slip by the vehicle body speed Vref.

As a result of determination at step S1, when it is determined that Condition 1 and Condition 2 are established together (step S1—Yes), a control flow goes to step S2, and otherwise (step S1—No), the control flow returns to S1.

At step S2, the ECU 30 determines whether or not all of Condition 3 to Condition 6 are established.

Condition 3: A road is a uniform road;

Condition 4: A region is a high G region;

Condition 5: The vehicle's own wheel is in a slip state; and

Condition 6: Wheel acceleration<vehicle body acceleration+Y.

Condition 3 shows that a vehicle is travelling on, for example, a good road with less irregularity. Condition 4 shows that a vehicle is travelling on a road which has a relatively large road surface μ and on which a large amount of deceleration is generated. Condition 5 shows, for example, that the slip amount (or slip rate) of a vehicle's own wheel is equal to or more than a predetermined amount.

Condition 6 determines whether or not a vehicle's own wheel is in a skid state, in other words, determines whether or not the friction coefficient μ of a road surface to the vehicle's own wheel does not yet reach the peak μ1. When the friction coefficient μ of the road surface to the vehicle's own wheel has reached the peak μ1 and has been in the skid state, the wheel acceleration (magnitude of wheel deceleration) of the vehicle's own wheel exceeds the vehicle body acceleration (magnitude of deceleration of the vehicle 100). When it is intended to hold the braking force of the vehicle's own wheel at the time the vehicle's own wheel is in the skid state, a slip may be grown and the vehicle's own wheel may be locked. In contrast, when the wheel acceleration of the vehicle's own wheel does not greatly exceed the vehicle body acceleration, that is, when the vehicle's own wheel is not in the skid state, it is possible to hold the braking force of the vehicle's own wheel without locking the wheel.

Condition 6 determines that the acceleration of the vehicle's own wheel is smaller than the value obtained by adding a predetermined acceleration Y to the vehicle body acceleration. The predetermined acceleration is determined base on, for example, a result of experiment. Condition 5 and Condition 6 may be determined so as to be established when, for example, the friction coefficient μ of a road surface to a vehicle's own wheel does not yet reach the peak and is in the vicinity of the peak. As an example, in a μ-s graph of FIG. 3, the friction coefficient μ in the vicinity of the peak μ1 can be set to the friction coefficient μ of a curved portion that is convex to the plus side of the friction coefficient μ having a center in the peak μ1. In the part (b) of FIG. 5, all of Condition 3 to Condition 6 are established at a time B and an affirmative determination is made at step S2.

As a result of determination at step S2, when it is determined that all of Condition 3 to Condition 6 are established (step S2—Yes), the control flow goes to step S3, and, otherwise (step S2—No), the control flow returns to step S1.

At step S3, the ECU 30 starts a hold request process to the vehicle's own wheel. The ECU 30 holds the brake fluid pressure to be supplied to the braking force generating means 41 of the vehicle's own wheel. When, for example, the brake fluid pressure to be supplied to the braking force generating means 41FL of a left the front wheels 1FL, the hold solenoid valve 53FL and the pressure reduction solenoid valve 54FL are closed. When the control at step S3 is executed, the control flow is finished. In FIG. 5, the brake fluid pressure starts to be held in the left the front wheels 1FL at the time B, and the front left wheel braking force Ffl changes approximately constantly. After the time B, since the load movement amount to the front wheels 1F is increased according to the increase of the front right wheel braking force Ffr, the generatable road surface reaction force Fs increases. With the operation, the left the front wheels 1FL which holds the braking force has an increased allowance for increasing the braking force.

At a time C, the front right wheel braking force Ffr catches up with the front left wheel braking force Ffl, thereby the magnitude of the slip amounts of the right/left wheels is inverted. With the operation, the left the front wheels 1FL that was the first wheel up to the time becomes the second wheel, and the right the front wheels 1FR that was the second wheel becomes the first wheel. Accordingly, after the time C, the front right wheel braking force Ffr is held and the front left wheel braking force Ffl is increased. When the front left wheel braking force Ffl has reached the generatable road surface reaction force Fs, the brake fluid pressure is reduced in the left the front wheels 1FL based on the slip amount. The pressure reduction amount $\Delta F$ at the time can be made to a pressure reduction amount smaller than a pressure reduction amount $\Delta F\_u$ in the conventional control. The small pressure reduction amount can be realized by cooperatively controlling the braking forces of the right/left wheels.

In the braking force control of the embodiment, the difference between the slip amounts of the right/left wheels can be suppressed from being increased by alternately increasing the braking forces of the right/left wheels. The generatable road surface reaction force Fs can be held to a high level by that the braking force of a symmetrical wheel has been sufficiently increased before the fluid pressure to a wheel is reduced. Accordingly, even if the pressure reduction amount $\Delta F$ in the pressure reduction mode is small, pressure can be increased again by appropriately reducing the slip amount. Further, setting the pressure reduction amount $\Delta F$ to a small value can suppress the generatable road surface reaction force Fs from being reduced. Further, since the pressure reduction amount $\Delta F$ is small, the braking force of the wheel 1 the pressure to which has been reduced can be recovered up to the generatable road surface reaction force Fs in a short time. Thus, according to the braking force control of the embodiment, the generatable road surface reaction force Fs can be increased toward the maximum generatable road surface reaction force Fs_max.

As described above, according to the braking force control of the embodiment, the frequency at which the brake fluid pressure is reduced can be reduced and the pressure reduction amount $\Delta F$ at the time the brake fluid pressure is reduced can be reduced by cooperatively controlling the braking forces of the right/left wheels. As a result, it is possible to derive the potential of the tires 2 by increasing the generatable road surface reaction force Fs and to appropriately exhibit the braking capability of the wheel 1. With the operation, deceleration $\alpha$ at the time the braking force control of the embodiment is executed becomes deceleration larger than deceleration $\alpha\_u$ when the conventional braking force control is executed. That is, according to the braking force control device 1-1 of the embodiment, the pressure reduction in an ABS braking force control can be suppressed and the deceleration can be improved. The improvement of the deceleration can improve the stability of the vehicle 100 that is realized by suppressing the wheels 1 from being locked and can reduce a braking distance at the same time at a high level.

In the embodiment, although the braking force (brake fluid pressure) of the vehicle's own wheel is held at step S3, the embodiment is not limited thereto. When all of Condition 1 to Condition 6 are established and the increase of the braking force of the vehicle's own wheel is suppressed, the braking force may be increased while suppressing the increasing speed of the braking force or the braking force may be reduced in place of holding the braking force. Note that, in the following explanation, the control, which suppresses the increase of the braking force of the vehicle's own wheel during the pressure increase mode because predetermined conditions (for example, all of Condition 1 to Condition 6) have been established, is also simply described as "braking force increase suppressing control". In the braking force increase suppressing control, it is sufficient to suppress the increasing speed of the brake fluid pressure in order to suppress the increasing speed of the braking force, and it is sufficient to reduce the braking force in order to reduce the brake fluid pressure.

When the increasing speed of the braking force is suppressed in the braking force increase suppressing control, the ECU 30 reduces the increasing speed of the braking force than, for example, the increasing speed before the braking force increase suppressing control is started. Further, the increasing speed of the braking force (pressure increasing gradient) of the first wheel is set smaller than the increasing speed of the braking force of the second wheel. In the braking force increase suppressing control, the increasing speed of the braking force may be set to an increasing speed in the range in which, for example, the slip amount of the vehicle's own wheel does not increase. Further, when the slip amount of the vehicle's own wheel is increased by the change of the braking force of other wheel, and the like, the braking force of the vehicle's own wheel may be reduced. To accurately control the increase and the reduction of the brake fluid pressure, it is preferable to control the hydraulic pressure to be supplied to the braking force generating means 41 by a valve that can be controlled to an optional degree of opening.

Note that, in the embodiment, although the start condition of the braking force increase suppressing control includes that both the wheels of the front wheels 1F are in the pressure increase mode (Condition 1 is established), the embodiment is not limited thereto. Even if a symmetrical wheel is in a mode other than the pressure increase mode, for example, in the pressure reduction mode and the hold mode, the braking force increase suppressing control may be able to be started.

Further, in the embodiment, although the start condition of the braking force increase suppressing control includes the uniform road (Condition 3 is established) and the high G region (Condition 4 is established), the embodiment is not limited thereto. The braking force increase suppressing control may be able to be started in a road other than the uniform road and in a road other than the high G region.

In the embodiment, although the braking force increase suppressing control is executed in the braking force control of the front wheels 1F, the braking force increase suppressing control may be executed in the braking force control of the rear wheels 1R. Likewise the case of the front wheels 1F, when the slip amount of the vehicle's own wheel exceeds the slip amount of a symmetrical wheel in the rear wheels 1R, the braking force increase suppressing control can be executed in the vehicle's own wheel. With the operation, the level of the braking force that can be generated in the vehicle 100 can be increased by reducing the difference between the slip amounts in the right/left wheels of the rear wheels 1R. The difference between the slip amounts of the right/left wheels can be reduced by suppressing the increase of the braking force of the first wheel that is the wheel 1 having a relatively large slip amount and increasing the braking force of the second wheel (symmetrical wheel) that is the wheel 1 having a relatively small slip amount in the rear left wheel 1RL and the rear right wheel 1RR. Further, the load movement amount to the front wheels 1F can be increased and the generatable road surface reaction force Fs of the front wheels 1F can be increased by alternately increasing the braking forces in the right/left wheels while reducing the difference between the slip amounts of the rear right/left wheels.

As described above, the generatable road surface reaction force Fs of the respective wheels, in particular, the generatable road surface reaction force Fs of the front wheels 1F can be increased by cooperatively control not only the braking force of the front wheels 1F but also the braking force of the rear wheels 1R. Note that the ground contact load of the rear wheels 1R is reduced by a load movement according to the increase of the braking force of the vehicle 100 in its entirety. Accordingly, an upper limit based on the peak μ may be determined to the braking force of the rear wheels 1R so that the friction coefficient μ of the rear wheels 1R does not reach the peak even if the load movement is caused by the increase of the braking force.

An upper limit may be set to the braking force (brake fluid pressure) of the rear wheels 1R based on, for example, the fluctuation amount of the ground contact load of the rear wheels 1R so that the friction coefficient μ does not reach the peak value μl in the rear wheels 1R when a load moves most forward. As an example, the upper limit of the braking force of the rear wheels 1R may be determined based on the change of the slip amount in the ABS cycles of the front wheels 1F, the vehicle body deceleration, and the like. The behavior stability of the vehicle 100 can be improved by setting the upper limit to the braking force of the rear wheels 1R and stopping the increase of the braking force of the rear wheels 1R before the friction coefficient μ of the road surface to the rear wheels 1R reaches the peak.

Note that, although the brake actuator 50 of the embodiment generates the braking force by the liquid pressure, the embodiment is not limited thereto. The brake actuator 50 may generate the braking force by other known method and may control the braking force.

The contents disclosed in the embodiment can be executed by being appropriately combined.

INDUSTRIAL APPLICABILITY

As described above, the braking force control device according to the present invention is suitable to appropriately exhibit the braking capabilities of wheels.

REFERENCE SIGNS LIST 1-1 braking force control device
1 wheel
2 tire
30 ECU
41FR, 41FL, 41RR, 41RL braking force generating means
50 brake actuator
100 vehicle
Ffr front right wheel braking force
Ffl front left wheel braking force
Fs generatable road surface reaction force
Fs_max maximum generatable road surface reaction force

The invention claimed is:

1. A braking force control device comprising:
an electronic control unit configured to control braking forces of respective wheels of a vehicle;
a brake actuator configured to be controlled by the electronic control unit so that a wheel braking force according to a target vehicle braking force is generated to the respective wheels; and
a braking force generating unit configured to generate braking forces for braking the wheels by fluid pressure of a working fluid supplied thereto, wherein
the electronic control unit suppresses increase of the braking force of a first wheel that is a wheel having a relatively large slip amount in a pair of right and left wheels by holding a fluid pressure of the first wheel, and increases the braking force of a second wheel that is a wheel having a relatively small slip amount until the slip amount of the second wheel becomes larger than the slip amount of the first wheel by increasing a fluid pressure of the second wheel,
wherein the electronic control unit holds the fluid pressure of the second wheel and increases the fluid pressure of the first wheel when the slip amount of the second wheel becomes larger than the slip amount of the first wheel.

2. The braking force control device according to claim 1, wherein
the electronic control unit suppresses the increase of the braking force of the first wheel before a friction coefficient of a road surface to the first wheel reaches a peak.

3. The braking force control device according to claim 1, wherein
the electronic control unit suppresses the increase of the braking force of the first wheel before a friction coefficient of a road surface to the first wheel reaches a peak and when the friction coefficient is in the vicinity of the peak.

4. The braking force control device according to claim 1, wherein
when the pair of the right/left wheels is the rear wheels of the vehicle, the increase of the braking force of the rear wheels is stopped before the friction coefficient of a road surface to the rear wheels reaches a peak.

5. The braking force control device according to claim 4, wherein
an upper limit of a braking force of the rear wheels when the increase of the braking force is stopped is based on a fluctuation amount of a ground contact load of the rear wheels at the time of braking.

6. The braking force control device according to claim 2, wherein
when the pair of the right/left wheels is the rear wheels of the vehicle, the increase of the braking force of the rear wheels is stopped before the friction coefficient of a road surface to the rear wheels reaches a peak.

7. The braking force control device according to claim 3, wherein
when the pair of the right/left wheels is the rear wheels of the vehicle, the increase of the braking force of the rear wheels is stopped before the friction coefficient of a road surface to the rear wheels reaches a peak.

* * * * *